United States Patent [19]

Tokumaru

[11] Patent Number: 4,844,600

[45] Date of Patent: * Jul. 4, 1989

[54] ZOOM LENS SYSTEM

[75] Inventor: Hisashi Tokumaru, Osaka, Japan

[73] Assignee: Minolta Camera Kabushiki Kaisha, Osaka, Japan

[*] Notice: The portion of the term of this patent subsequent to Jan. 13, 2004 has been disclaimed.

[21] Appl. No.: 1,201

[22] Filed: Jan. 7, 1987

Related U.S. Application Data

[62] Division of Ser. No. 467,433, Feb. 17, 1983, Pat. No. 4,636,040.

[30] Foreign Application Priority Data

Feb. 19, 1982 [JP] Japan .................... 57-026637
May 19, 1982 [JP] Japan .................... 57-085279

[51] Int. Cl.$^4$ .................. G02B 15/16; G02B 15/177; G02B 15/22

[52] U.S. Cl. .................... 350/427; 350/426; 350/428

[58] Field of Search ............... 350/423, 426, 427, 428

[56] References Cited

U.S. PATENT DOCUMENTS

| | | | |
|---|---|---|---|
| 3,972,056 | 7/1976 | Tsujimoto et al. | 350/427 |
| 4,196,969 | 4/1980 | Itoh | 350/427 |
| 4,465,343 | 8/1984 | Horimoto | 350/427 |
| 4,492,437 | 1/1985 | Masumoto et al. | 350/427 |
| 4,494,828 | 1/1985 | Masumoto et al. | 350/427 |
| 4,516,839 | 5/1985 | Tokumaru | 350/427 |
| 4,634,236 | 1/1987 | Masumoto | 350/427 |
| 4,636,040 | 1/1987 | Tokumaru | 350/427 |

FOREIGN PATENT DOCUMENTS

| | | |
|---|---|---|
| 45-12715 | 5/1970 | Japan . |
| 53-66223 | 6/1978 | Japan . |
| 53-66224 | 6/1978 | Japan . |
| 56-21112 | 2/1981 | Japan . |
| 56-165107 | 12/1981 | Japan . |
| 57-4018 | 1/1982 | Japan . |

Primary Examiner—Bruce Y. Arnold
Assistant Examiner—Scott J. Sugarman
Attorney, Agent, or Firm—Price, Gess & Ubell

[57] ABSTRACT

A zoom lens system with a focusing system other than a front group focusing system is provided. The lens system comprises a first lens group including at least two sub-groups with a variable air space therebetween to be varied during zooming, and a focusing lens group located at the image side of the first lens group, the lateral magnification $\beta_F$ with respect to the focusing lens group being continuously variable during zooming with a condition, $$|\beta_F| > 1$$

always fulfilled so that $|\beta_F|$ is increased in accordance with the increase of the focal length of the whole lens system. The focusing lens group may be divided into two or three sub-groups with a variable air space therebetween to be varied during zooming. Further, an additional lens group may be located at the image side of the focusing lens group.

6 Claims, 9 Drawing Sheets

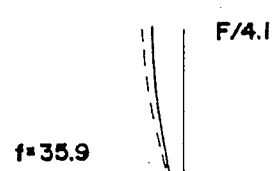
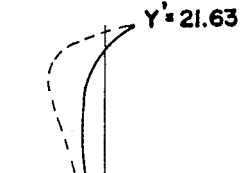
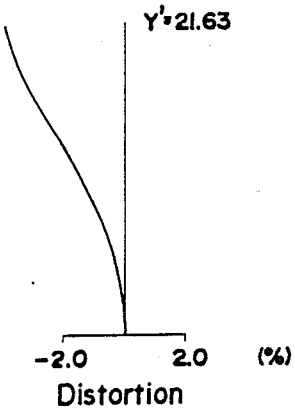
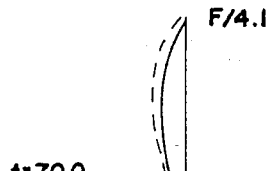
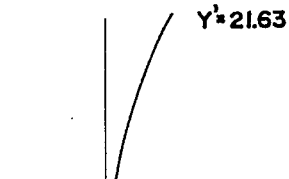
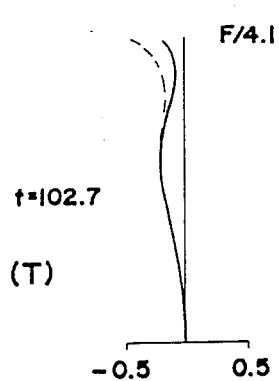
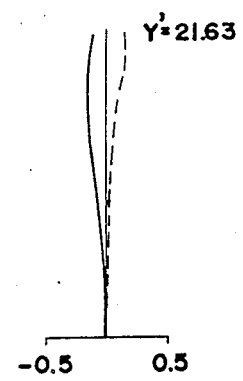
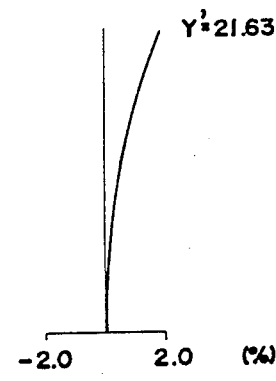

f=28.8
(W)

Spherical Aberration
Sine Condition

Astigmatism

Distortion f=60.0
(M)

Spherical Aberration
Sine Condition

Astigmatism

Distortion f=131.5
(T)

Spherical Aberration
Sine Condition

Astigmatism

Distortion

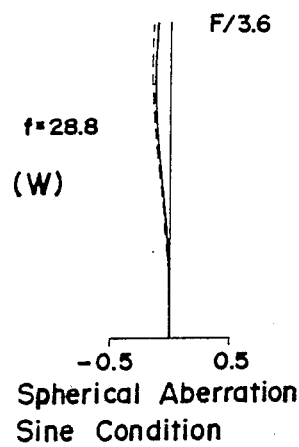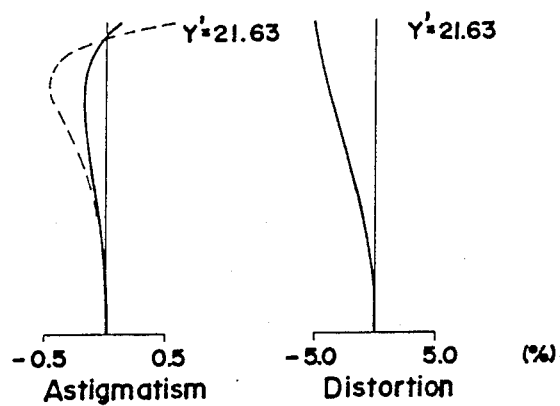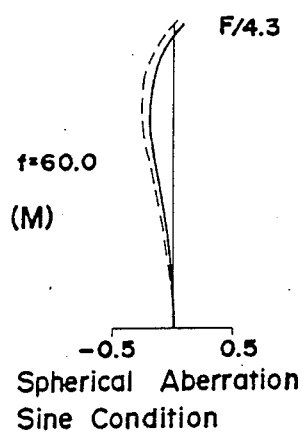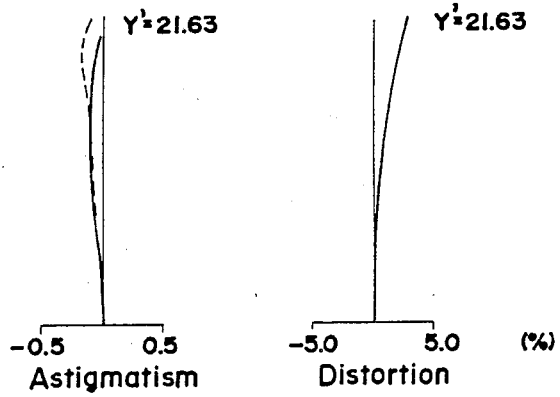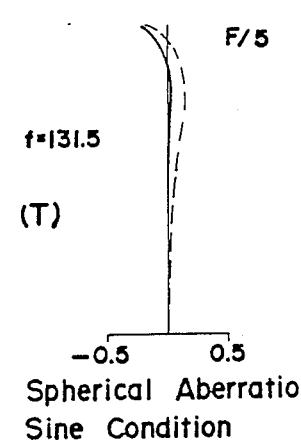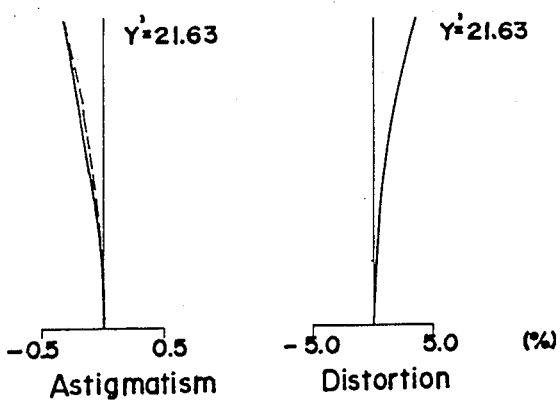

ZOOM LENS SYSTEM

This is a division of application Ser. No. 467,433, filed Feb. 17, 1983 now U.S. Pat. No. 4,636,040.

BACKGROUND OF THE INVENTION

1. Field of the Invention

The present invention relates to a zoom lens system, and more particularly to a zoom lens system with an improved focusing system.

2. Description of the Prior Art

In this field of art, various focusing systems have been developed for a zoom lens system, in which the most conventional one is the so-called front group focusing system to locate the focusing lens group at the front of the lens system and shift it along the optical axis. This front group focusing is popularly adopted to most of the zoom lens systems since the shifting distance of the focusing lens group to focus an identical photographic distance is substantially unchanged throughout the whole zoom range.

The front group focusing is, however, unfavorable to a wide angle zoom lens system due to the refractive power and the necessary shifting distance of the focusing lens group. In such a wide angle zoom lens system, accordingly, it is necessary to adopt another focusing system, such as a whole lens system focusing to shift the entire lens system, or the internal group focusing to shift an internal lens group within the lens system, or the rear group focusing to shift the rearmost lens group of the lens system.

In these focusing systems other than the front group focusing system, however, the shifting distance necessary to focus an identical object distance is changed in dependence on the change in the focal length within the zoom range, i.e., the shifting distance should be increased in accordance with the increase in the focal length even if the object distance is maintained. In the whole lens system focusing, for example, the ratio of the shifting distance for focusing at the longest focal length position to that at the shortest focal length position is even the square of the zoom ratio.

Thus, these focusing systems inevitably necessitate a lens barrel mechanism with an additional complexity in that some mechanical means is required for compensating such a difference in the shifting distance in automatic response to the change in the focal length. Although the compensation of the difference in the shifting distance may be alternatively carried out by an electric means to avoid such a mechanical complexity in an automatic focusing system in which the control of the shifting distance is responsive to an electric signal, an excessive difference in the shifting distance would be still unfavorable to such an electric means in view of the rapidity of focusing, driving energy for focusing, and the necessary space to be left for shifting the focusing lens group.

Further, especially in a zoom lens system with a relatively great zoom ratio covering a wide field angle range, an available focusing system is limited.

SUMMARY OF THE INVENTION

An object of the present invention is to provide a zoom lens system with a novel focusing system other than the front group focusing, in which the ratio of the shifting distance for focusing at the longest focal length position to that at the shortest focal length position is extremely small such as 2 to 3 or less.

Another object of the present invention is to provide a zoom lens system with a novel focusing system other than the front group focusing, in which the difference in the shifting distance for focusing caused by the change in the focal length is so small that the deviation of the image point due to the change in the focal length is within the depth of focus even if an identical shifting distance for focusing an identical photographing distance is adopted across the entire zoom range.

Still another object of the present invention is to provide a zoom lens system with a novel focusing system comparative to the conventional front group focusing in view of the shifting distance of the focusing lens group.

A further object of the present invention is to provide a novel focusing system not only comparative to the conventional front group focusing but also superior to it due to the applicability to a wide angle zoom lens system.

An additional object of the present invention is to provide a zoom lens system with a relatively great zoom ratio covering a wide field angle range having the above mentioned novel focusing system.

According to the present invention the zoom lens system comprises a first lens group with its total focal length variable during zooming, and a focusing lens group located at the image side of the first lens group and shiftable along the optical axis for focusing, the lateral magnification $\beta_F$ with respect to the focusing lens group being continuously changing during zooming with the condition, $$|\beta_F| > 1$$

always fulfilled so that $|\beta_F|$ is increased in accordance with the increase of the focal length of the whole lens system.

Further according to the present invention, a zoom lens system with a relatively great zoom ratio covering a wide field angle range is provided with the above mentioned novel focusing system by means of a feature that the first lens group is of a negative refractive power in total and includes at least two sub-groups with the frontmost sub-group being positive, and the focusing lens group is of a positive refractive power in total to converge the light pencil at the image side thereof and includes three sub-groups, the total focal length of the focusing lens group being variable during zooming, while the focusing lens group being shiftable in a body for focusing without changing its total focal length, wherein the lens system fulfills the following condition:

$$-2 < \beta_{FW} \leq -1.05$$

wherein $\beta_{FW}$ represents the lateral magnification with respect to the focusing lens group at the shortest focal length of the whole lens system in zooming when the lens system is focused to infinity.

The objects and features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIGS. 8a, 8b and 8c represent graphic plots of various aberrations of the third embodiment in the shortest focal length position;

FIGS. 9a, 9b and 9c represent graphic plots of various aberrations of the third embodiment in the medium focal length position;

FIGS. 10a, 10b and 10c represent graphic plots of various aberrations of the third embodiment in the longest focal length position;

FIGS. 17a, 17b and 17c represent graphic plots of various aberrations of the sixth embodiment in the shortest focal length position;

FIGS. 18a, 18b and 18c represent graphic plots of various aberrations of the sixth embodiment in the medium focal length position; and FIGS. 19a, 19b and 19c represent graphic plots of various aberrations of the sixth embodiment in the longest focal length position.

DETAILED DESCRIPTION OF THE PREFERRED EMBODIMENTS

Figure 1:
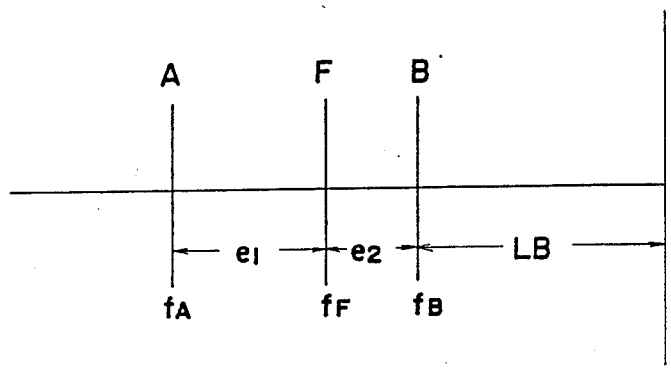
FIG. 1 represents a schematic illustration of a thin lens system for generally explaining the present invention.

The following description is provided to enable any person skilled in the optical art to make and use the present invention and sets forth the best modes contemplated by the inventor of carrying out his invention. Various modifications, however, will remain readily apparent to those skilled in the art, since the generic principles of the present invention have been defined herein specifically to provide a zoom lens system with a novel focusing system.

The derivation of the specified parameters of the lens embodiments disclosed herein can be accomplished with the assistance of a computer. The present invention represents the parameters of a compromised balance of acceptable aberrations in a relatively easily manufactured lens assembly that is particularly suited for a 35 mm single lens reflex camera. The data presented herein in the tables, to be discussed subsequently, are more than adequate to permit a competent artisan in the optical art to reproduce the embodiments of the present invention. In the accompanying drawings, which supplement the following tables, the lenses in accordance with the present invention are illustrated schematically or as a thin lens system. As usual, in conventional lens diagrams, the light is assumed to travel from left to right. Due to the large number of lens elements involved, the drawings have omitted the symbols for the radii of curvature and axial distances. The tables, however, more than adequately provide this information.

In the tables relating to the third, fifth and sixth embodiments, the radius of curvature is disclosed and is indicated by the letter, r, with a subscript corresponding to the consecutive surfaces of the lens elements from left to right, wherein minus (−) signs indicate surfaces concave toward the object side, while the surfaces without a sign are convex toward the object side. The axial distances are designated with the letter, d, again with the subscript indicating the axial distance consecutively from the left to the right. The axial distances will include both the thickness of the lens and the air spaces, and in this regard, the value of the axial distances between the lens elements are appropriately positioned in the tables relative to the values of the radius of curvature to indicate whether the axial distance is an air space or a thickness of the lens. With respect to each variable air space, three values are given corresponding to the shortest, medium and longest focal lengths, respectively, in this order. The tables also provide, with respect to each embodiment, the shortest, medium and longest focal lengths, the total length of the lens system for the respective focal lengths in the corresponding order, and the F number in the same manner if it depends on the focal length. The refractive index is designated as N, while the Abbe numder is $\nu$.

According to the present invention a zoom lens system with a novel focusing system is provided, which comprises a first lens group (A) including at least two sub-groups with a first variable air space therebetween, the total focal length of the first lens group being variable in accordance with the change in the first variable air space during zooming, and a focusing lens group (F) located at the image side of the first lens group (A) and shiftable along the optical axis toward the image side for focusing a closer object, the lateral magnification $\beta_F$ with respect to the focusing lens group (F) being continuously changing during zooming with a condition, $$|\beta_F|>1$$

always fulfilled so that $|\beta_F|$ is increased in accordance with the increase of the focal length of the whole lens system.

FIG. 1 represents a thin lens system at a given focal length in the zoom range for generally explaining the zoom lens system according to the present invention, wherein A represents a first lens group with focal length $f_A$, F represents a focusing lens group with focal length $f_F$ located at the image side of the first lens group A with a thin lens distance $e_1$, and B represents a lens group with focal length $f_B$ which is generally located at the image side of the focusing lens group F with a thin lens distance $e_2$ and may be omitted in a specific case. The focal lengths $f_A$, $f_F$ and $f_B$ each may vary during zooming. Provided that f represents the focal length of the whole lens system, LB represents the back focal distance, and $\beta_F$ and $\beta_B$ represent the lateral magnifications for the focusing lens group F and for the lens group B, respectively, following equations result:

$$f = f_A \beta_F \beta_B \tag{1}$$

$$e_1 = f_A + \left(1 - \frac{1}{\beta_F}\right) f_F \tag{2}$$

$$e_2 = (1 - \beta_F) f_F + \left(1 - \frac{1}{\beta_B}\right) f_B \tag{3}$$

$$LB = (1 - \beta_B) f_B \tag{4}$$

In view of equation (1), at least one of $f_A$, $\beta_F$ and $\beta_B$ should be changed during zooming.

Figure 2:
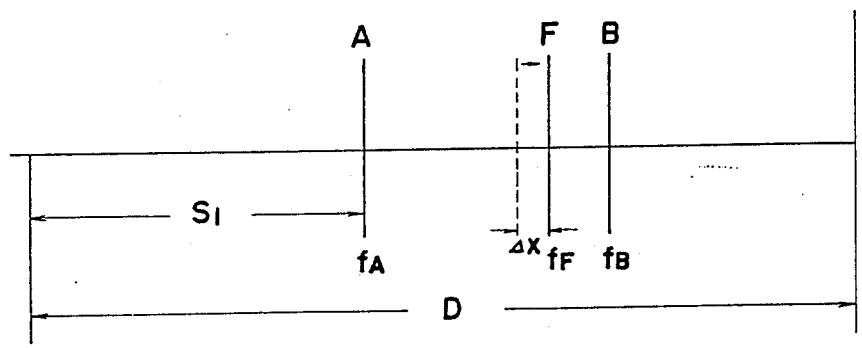
FIG. 2 represents a schematic illustration of the thin lens system of FIG. 1 in a close focusing position.

FIG. 2 represents a position of the lens system of FIG. 1 in which the lens system is focused on an object at distance $S_1$ measured from the first lens group A by means of shifting the focusing lens group F toward the image side by $\Delta X$. In this case the following equations result, provided that $\beta_A'$ and $\beta_F'$ represent the lateral magnifications for the first lens group A and for the focusing lens group F, respectively, in the position of FIG. 2:

$$S_1 = \left(1 - \frac{1}{\beta_A}\right) f_A \tag{5}$$

$$e_1 + \Delta X = (1 - \beta_A') f_A + \left(1 - \frac{1}{\beta_F'}\right) f_F \tag{6}$$

$$e_2 - \Delta X = (1 - \beta_F') f_F + \left(1 - \frac{1}{\beta_B}\right) f_B \tag{7}$$

With respect to the back focal distance LB, an identical equation to equation (4) also holds good in the case of FIG. 2.

With respect to any questions as to whether the above values are each positive or negative, f in equation (1) has to be apparently positive since it represents the focal length of the whole lens system designed as an objective lens, while the focal lengths $f_A$, $f_F$ and $f_B$ and the lateral magnifications $\beta_A'$, $\beta_F$, $\beta_F'$ and $\beta_B$ can be generally positive or negative with the following restrictions added. Namely, a relation, $\beta_A' \cdot f_A < 0$ practically results in view of equation (5) since $S_1$ has to be positive. Further, $(1 - \beta_B) f_B > 0$ results from equation (4) since LB has to be also positive. Each magnification is generally positive if the object point and the image point are on the same side of a lens group in question, while negative if the object and image points are on the opposite sides of the lens group in question. With respect to the thin lens distance $e_1$ and $e_2$, it should be noted that a negative value is possible in view of the location of the principal point of the lens group. Finally, the shifting distance $\Delta X$ for focusing is positive if the focusing lens group is shifted toward the image side, while negative if it shifted toward the object side, as will be understood from FIG. 2.

By subtracting equation (7) from equation (3), the following equation results:

$$\Delta X = (\beta_F' - \beta_F) f_F$$

which is simplified as follows:

$$\Delta X = \Delta \beta_F \cdot f_F \tag{8}$$

wherein:

$$\Delta \beta_F = \beta_F' - \beta_F.$$

On the other hand, by means of subtracting equation (2) from equation (6) and, in turn, adjusting the result in utilization of equation (8), the following equation is concluded:

$$\beta_A' = \frac{1 - \beta_F(\beta_F + \Delta \beta_F)}{\beta_F(\beta_F + \Delta \beta_F)} \cdot \frac{\Delta X}{f_A} \tag{9}$$

Nothing that $\beta_A' f_A < 0$, equation (9) means that $\beta_F \beta_F' > 1$ if $\Delta X > 0$ and $\beta_F \beta_F' < 1$ if $\Delta X < 0$. In other words, the focusing lens group F is shifted for close focusing toward the image side if $|\beta_F| > 1$, and toward the object side if $|\beta_F| < 1$.

According to FIG. 2, the photographing distance D upon close focusing can be represented by the following equation:

$$D = S_1 + e_1 + e_2 + LB.$$

By means of substitutions utilizing equations (2) to (5) with equation (9) taken into consideration in utilizing equation (5), the above equation is converted into the following equation (10):

$$(D - Q)\Delta X = P \tag{10}$$

wherein:

$$P = \frac{f_A^2 \beta_F^2}{\beta_F^2 - 1} \tag{11}$$

$$Q = \frac{\beta_F}{\beta_F^2 - 1} \cdot \frac{f_A^2}{f_F} + 2 f_A + \left(2 - \beta_F - \frac{1}{\beta_F}\right) f_F + \left(2 - \beta_B - \frac{1}{\beta_B}\right) f_B \tag{12}$$

Here, it should be noted that the following approximation is adopted in utilizing equation (9) to obtain the above equation (10), on the assumption that $\Delta \beta_F << \beta_F$.

$$\frac{\beta_F(\beta_F + \Delta\beta_F)}{\beta_F(\beta_F + \Delta\beta_F) - 1} \approx \frac{\beta_F^2 + \Delta\beta_F\beta_F}{\beta_F^2 - 1} \tag{13}$$

As will be understood from equation (11), the equation (10) would be indefinite if $\beta_F^2 = 1$. Therefore, the discussion hereinafter is limited to a case wherein $\beta_F^2 \neq 1$.

The above equation (10) represents a basic relation of the shifting distance $\Delta X$ to the photographing distance D, in which values P and Q pertain thereto. In other words, the equation (10) corresponds to a function of a hyperbola with P and Q related as parameters. If P or Q changes during zooming, the shifting distance $\Delta X$ would vary even if the photographing distance D is unchanged. Therefore, for reducing the difference in the shifting distance $\Delta X$ depending on the change in the focal length of the whole lens system, it is necessary to minimize the change in P and Q during zooming.

A consideration on equations (11) and (12) will reveal that the change in P has a greater influence on the difference in the shifting distance $\Delta X$ during the zooming than the change in Q, since the value P varies substantially in accordance with even a square function of the focal length $f_A$ of the first lens group A, in contrast to that, the value Q varies substantially in accordance with rather a linear function of the focal length $f_A$. Therefore, it is quite effective to especially reduce any change in P during zooming for the purpose of minimizing the difference in the shifting distance depending on the change in focal length of the whole lens system during zooming.

Thus, the following discussion will be firstly directed to how to reduce the change in P during zooming. It considering on equation (11), it will be firstly noted that P is maintained if both $f_A$ and $\beta_F$ are unchanged during zooming. In this case, only $\beta_B$ is to be changed for changing the focal length f during zooming as is understood from equation (1), which is equivalent to the conventional front group focusing. Therefore, this case cannot be adopted to the present invention, and other ways to reduce the change in P should be sought.

In other words, to achieve the object of the present invention, $f_A$ or $\beta_F$ should be changed during zooming. This means that the change in P during zooming cannot be reduced unless both $f_A$ and $\beta_F$ have to be changed in a cooperative manner during zooming. Thus, a first conclusion characterizing the present invention is reached, which is that:

(i) both the focal length $f_A$ of the first lens group A and the lateral magnification $\beta_F$ with respect to the focusing lens group F have to be variable during zooming if it is desired to reduce the change in P during zooming.

Further, if the value $f_A^2 \cdot \beta_F^2$ at the numerator of the right hand side of equation (11) is put under consideration, an understanding that $f_A^2 \cdot \beta_F^2$ is increased in accordance with the increase of the focal length f is reasonably obtained since it is natural to increase f by means of increase $f_A \cdot \beta_F$ in accordance with equation (1). This means that the denominator, $(\beta_F^2 - 1)$ of equation (11) has to be also increased in accordance with the increase of the focal length f if the change in P depending on f is desired to be reduced. For this purpose, $|\beta_F|$ should be increased in accordance with the increase of the focal length f, if $|\beta_F| > 1$. Or, alternatively, $|\beta_F|$ should be reduced in accordance with the increase of the focal length f, if $|\beta_F| < 1$. The latter case of $|\beta_F| < 1$ is, however, corresponding to an unreasonable case in that the magnification with respect to the focusing lens group F is reduced in accordance with an increase of the focal length f, which is unfavorable to the general demand of increasing the possible zoom ratio in designing a zoom lens system. Thus, second and third conclusions further characterizing the present invention are reached, which are that:

(ii) a condition $|\beta_F| > 1$ has to be always fulfilled during zooming if it is desired to reduce the change in P during zooming; and (iii) $|\beta_F|$ has to be increased in accordance with the increase of the focal length of the whole lens system if it is desired to reduce the change in P during zooming.

To practically realize the above mentioned conclusions, the first lens group A is necessary to include at least two sub-groups with a first variable air space therebetween, whereby the total focal length $f_A$ is variable by means of changing the first variable air space during zooming. Further, the change in $\beta_F$ during zooming can be practically realized by means of moving the focusing lens group F along the optical axis during zooming, or alternatively, by means of positioning another lens group B at the image side of the focusing lens group F and moving such a lens group B along the optical axis during zooming.

Above conclusions (i) to (iii) result from an analytical consideration on the equation (11). From a direct point of view, however, the equation (11) of course tells that the difference in the shifting distance depending on the change in focal length of the whole lens system is effectively reduced, if a value, $$\frac{f_A \cdot \beta_F}{\sqrt{\beta_F^2 - 1}}$$

itself is substantially maintained during zooming.

Now, the discussion is advanced to a developed object of the present invention to make it possible to adopt an identical shifting distance for focusing an identical photographing distance regardless of the change in the focal length of the whole lens system. To attain this object of the present invention, both the following conditions should be fulfilled during zooming in view of the above equations (10) to (12):

$$P = \text{constant} \tag{14}$$

$$Q = \text{constant} \tag{15}$$

If any one of the above conditions (14) and (15) is not fulfilled during zooming, the hyperbola represented by the equation (10) would change its shape in accordance with the zooming to cause the difference in the shifting distance. P can be positive or negative in accordance with $|\beta_F| > 1$ or $|\beta_F| < 1$, respectively as is understood from equation (11).

In discussing how to realize conditions (14) and (15) during zooming, condition (14) is to be firstly investigated since the value P is of a greater significance as has been already mentioned. From equation (11) and condition (14), the following condition results:

$$P = \frac{f_A^2 \cdot \beta_F^2}{\beta_F^2 - 1} = \text{constant} \tag{16}$$

To fulfill condition (16), a case of changing only $\beta_B$ with $f_A$ and $\beta_F$ both maintained to change f in accordance with equation (1) is excluded, since this case corresponds to the conventional front group focusing as has been already pointed out. Further, a case of maintaining $f_A$ to fulfill condition (16) is impossible unless $\beta_F$ is also maintained to result in the conventional front group focusing.

Thus, to fulfill the condition (16) in a manner other than the conventional front group focusing, $f_A$ should be varied during zooming, which means that $\beta_F$ should also be varied during zooming. As has been already noted, the variation of $\beta_F$ during zooming is possibly by means of leaving the focusing lens group F stationary during zooming and moving the lens group B, as well as moving the focusing lens group F itself during zooming.

The requirement that condition (16) should be fulfilled between the shortest and the longest focal length positions of the zoom lens system means that:

$$\frac{f_{AW}^2 \cdot \beta_{FW}^2}{\beta_{FW}^2 - 1} = \frac{f_{AT}^2 \cdot \beta_{FT}^2}{\beta_{FT}^2 - 1}$$

provided that $f_{AW}$ and $\beta_{FW}$ represent the focal length of the first lens group A and the lateral magnification with respect to the focusing lens group F at the shortest focal length position with the lens system focused in infinity, respectively, and $f_{AT}$ and $\beta_{FT}$ represent those at the longest focal length position with the lens system focused in infinity, respectively. The above equation can be modified as follows:

$$\left(\frac{f_{AT}}{f_{AW}}\right)^2 = \frac{1 - \left(\frac{1}{\beta_{FT}}\right)^2}{1 - \left(\frac{1}{\beta_{FW}}\right)^2} \tag{17}$$

In considering on the equation (17), a relation, $f_{AT} > f_{AW}$ is reasonable since the focal length $f_A$ is practically increased in accordance with the increase in the focal length f during zooming. Therefore, the following relation is derived from equation (17):

$$\frac{1 - \left(\frac{1}{\beta_{FT}}\right)^2}{1 - \left(\frac{1}{\beta_{FW}}\right)^2} > 1$$

Therefore, when $\beta_{FW}^2 < 1$, $$1 > |\beta_{FW}| > |\beta_{FT}| \tag{18; and}$$

when $\beta_{FW}^2 > 1$, $$1 < |\beta_{FW}| < |\beta_{FT}| \tag{19}$$

wherein, the signs (+ or −) of $\beta_{FW}$ and $\beta_{FT}$ are identical to each other.

The relation (18), which tells that the lateral magnification $\beta_F$ is reduced in accordance with the increase of the focal length f during zooming, is not practical unless the demand of increasing the zoom ratio is given up. On the contrary, the relation (19), which tells the lateral magnification $\beta_F$ is increased in accordance with the increase of the focal length f during zooming, is very favorable to the demand of increasing the zoom ratio. Thus, the relation (19) is preferred according to the present invention as a condition necessary to attain condition (14). It should be noted that relation (19) certifies the already mentioned conclusions (ii) and (iii) of the present invention.

Further, equation (11) tells us that P becomes nearly equal to $f_A^2$, if $\beta_F \gg 1$ to make $\beta_F^2 - 1 \doteq \beta_F^2$. This means that condition (14) cannot be fulfilled unless $f_A$ is constant, which corresponds to the case of the conventional front group focusing. Thus, $\beta_F^2$ should not so differ from 1. In other words, $|\beta_{FW}| < 2$ is required.

Then, the discussion is to be advanced to the investigation into condition (15) relating to Q. The equation (12) can be arranged with respect to $\beta_F$ in utilizing equation (11) and relation (19) as follows:

$$Q = -\frac{1}{f_F \beta_F}\{f_F^2(\beta_F^2 + 1) \mp 2\sqrt{P} \cdot \tag{20}$$

$$f_F\sqrt{\beta_F^2 - 1} - P\} + 2f_F + \left(2 - \beta_B - \frac{1}{\beta_B}\right)f_B =$$

$$-\frac{f_F}{\beta_F}\left\{\beta_F^2 \mp 2 \cdot \frac{\sqrt{P}}{f_F}\sqrt{\beta_F^2 - 1} + 1 - \left(\frac{\sqrt{P}}{f_F}\right)^2\right\} +$$

$$2f_F + \left(2 - \beta_B - \frac{1}{\beta_B}\right)f_B$$

wherein the composite sign ($\mp$) is negative (−) when $f_A \cdot \beta_F > 0$, and positive when $f_A \cdot \beta_F < 0$. The equation (20) makes it possible to know how to fulfull condition (15). According to the equation (20), Q is generally a function of $f_F$, $f_B$, $\beta_F$ and $\beta_B$. For the purpose of an effective analysis, however, if an assumption that $f_F$, $f_B$ and $\beta_B$ are constant during zooming is made to regard Q as a function, $G(\beta_F)$ of only $\beta_F$, the equation (20) is represented as follows:

$$G(\beta_F) = -\frac{f_F}{\beta_F}\left\{\beta_F^2 \mp 2\left(\frac{\sqrt{P}}{f_F}\right)\sqrt{\beta_F^2 - 1} + \tag{21}$$

$$1 - \left(\frac{\sqrt{P}}{f_F}\right)^2\right\} + 2f_F + \left(2 - \beta_B - \frac{1}{\beta_B}\right)f_B$$

Although equation (21) apparently tells that the condition (15) cannot be fulfilled under the above assumption that $f_F$, $f_B$ and $\beta_B$ are constant during zooming, the equation (21) is worth investigating further. Under the definition that:

$$X^2 = \beta_F^2 - 1 \tag{22},$$

the equation (21) can be modified as follows:

$$G(X) = \mp f_F \frac{\left\{X^2 \mp 2\left(\frac{\sqrt{P}}{f_F}\right)X + 2 - \left(\frac{\sqrt{P}}{f_F}\right)^2\right\}}{\sqrt{X^2 + 1}} + \tag{23}$$

-continued $$2f_F + \left(2 - \beta_B - \frac{1}{\beta_B}\right)f_B$$

wherein X is assumed positive since the equation (23) is symmetric with respect X=0, and wherein the composite sign ($\mp$) in front of $f_F$ is negative when $\beta_F > 1$, and positive when $\beta_F < -1$.

Since the equation (23) includes two composite signs, ($\mp$) and ($\pm$) to be an extremely complex equation, it is believed adequate to divide equation (23) into the following four cases classified in accordance with the value for $f_A \cdot \beta_F$ and the value for $\beta_F$. Further, in the following four cases, the term, $$\left(2 - \beta_B - \frac{1}{\beta_B}\right)f_B$$

in the equation (23) is neglected for the purpose of simplicity. Namely:

(I) when $f_A\beta_F > 0$ and $\beta_F < -1$, $$G(X) = f_F\left\{2 + \frac{X^2 - 2\left(\frac{\sqrt{P}}{f_F}\right)X + 2 - \left(\frac{\sqrt{P}}{f_F}\right)^2}{\sqrt{X^2 + 1}}\right\};$$

(II) when $f_A\beta_F > 0$ and $\beta_F > 1$, $$G(X) = f_F\left\{2 - \frac{X^2 - 2\left(\frac{\sqrt{P}}{f_F}\right)X + 2 - \left(\frac{\sqrt{P}}{f_F}\right)^2}{\sqrt{X^2 + 1}}\right\};$$

(III) When $f_A\beta_F < 0$ and $\beta_F < -1$, $$G(X) = f_F\left\{2 + \frac{X^2 + 2\left(\frac{\sqrt{P}}{f_F}\right)X + 2 - \left(\frac{\sqrt{P}}{f_F}\right)^2}{\sqrt{X^2 + 1}}\right\};$$

(IV) when $f_A\beta_F < 0$ and $\beta_F > 1$, $$G(X) = f_F\left\{2 - \frac{X^2 + 2\left(\frac{\sqrt{P}}{f_F}\right)X + 2 - \left(\frac{\sqrt{P}}{f_F}\right)^2}{\sqrt{X^2 + 1}}\right\}.$$

With respect to whether $f_F$ is positive or negative, the following points are concluded. In the case (I), $f_F$ should be positive since the necessary assumption for case (I) that $\beta_F < -1$ is impossible under the requirement of $f_A < 0$, if $f_F$ is negative. On the other hand, in the case (II), $f_F$ should be negative since $\beta_F > 1$ is impossible unless a real image has to be once formed within the lens system, if $f_F$ is positive. Finally, in the cases (III) and (IV), $f_F < 0$ and $f_F > 0$, respectively, if similar considerations are made as in cases (I) and (II). Further, in the cases (III) and (IV), it should be noted that the lens group B is inevitable to make the focal length f positive since $f_A\beta_F$ is negative in these cases, the lateral magnification $\beta_B$ with respect to such a lens group B being negative in accordance with equation (1).

Figure 3:
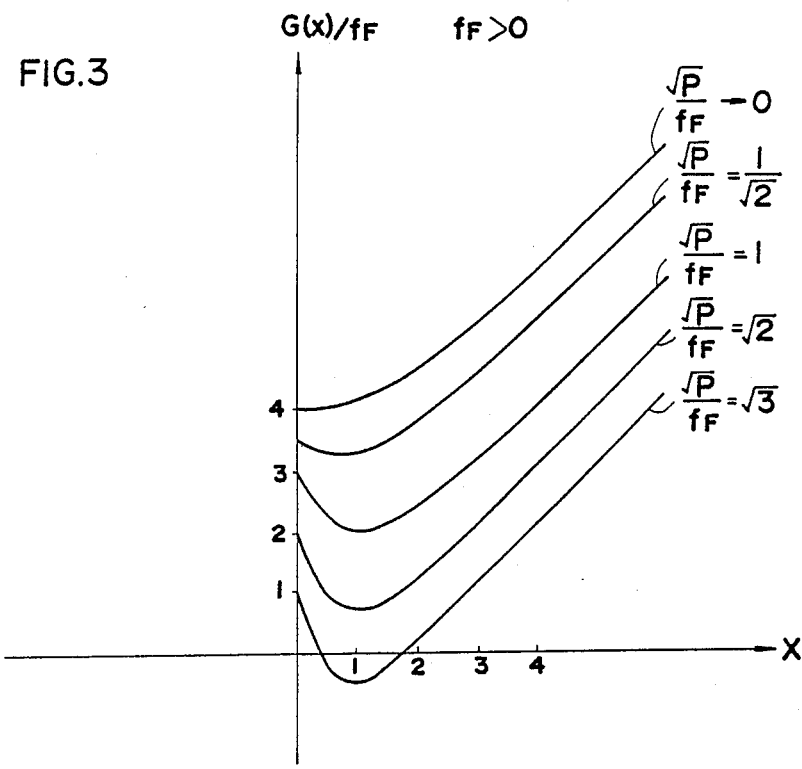
FIG. 3 represents a graphic illustration showing a relationship between a value X relating to the lateral magnification with respect to the focusing lens group and a value $G(X)/f_F$ relating to the difference in shifting distance for focusing, for a case of $f_A\beta_F>0$ and $\beta_F<-1$.

Specifically, with respect to the case (I), FIG. 3 represents the relation of $G(X)/f_F$ to X with various values for the parameter $\sqrt{P}/f_F$. According to FIG. 3, the value $G(X)/f_F$ has an extreme value at about X=1, i.e., $\beta_F = -\sqrt{2}$. Therefore, a change of $\beta_F$ during zooming within a limited range including $\beta_F = -\sqrt{2}$ causes a minimum change in $G(\beta_F)$, i.e., the minimum change in Q.

From the above discussion, with the fact that the above discussion is based on an approximation taken into consideration, it is concluded that $\beta_{FW}$, which is the minimum value for $\beta_F$ in view of the already mentioned conclusion (iii) or relation (19), is to practically fulfill the following condition:

$$1 < |\beta_{FW}| < 2$$

In other words, an excessively great value for $|\beta_{FW}|$ is inadequate. This conforms with the already mentioned requirement that $|\beta_{FW}| < 2$.

Although the change in $G(X)/f_F$ adjacent to the extreme value becomes greater in accordance with the increase in the parameter $\sqrt{P}/f_F$ as in FIG. 3, the change in $G(X)$ itself does not become so great in dependence on the change in parameter $\sqrt{P}/f_F$ since $G(X)$ is proportional to $f_F$ which decreases for an identical value for P in accordance with the increase of the parameter $\sqrt{P}/f_F$. An excessively small value for $f_F$ is, however, inadequate in view of necessary aberration correction of a zoom lens system.

Following table 1 represents a first embodiment of the present invention in a paraxial region designed in accordance with the above case (I), in which lens group B is omitted with the parameter $\sqrt{P}/f_F$ selected as follows:

$$\frac{\sqrt{P}}{f_F} = 1 \tag{24}$$

In the first embodiment, values for $f_W$, $f_T$, $f_{AW}$, $f_{AT}$, $f_W$ and $\beta_{FT}$ are determined in the following manner wherein $f_W$ and $f_T$ represent the focal length of the whole lens system at the shortest and the longest focal length positions. Namely, provided that:

$f_W = 28$, $f_T = 135$, and $\beta_{FW} = -1.2$, equation (1) determines that $f_{AW} = -23.333$ Further, equations (11), (13) and (23) determine that $f_F = 42.212$, and $\beta_{FT} = -3.35$, and equation (1) determines that $f_{AT} = -40.299$

TABLE 1

(Embodiment 1)

| (W) | $f_w =$ | 28 | | | |
|---|---|---|---|---|---|
| | | $f_{AW}$ | −23.333 | | |
| | | | | $e_{1W}$ | 54.056 |

TABLE 1-continued (Embodiment 1)

|     |         | $f_F$    | 42.212  |         |         |
|-----|---------|----------|---------|---------|---------|
|     |         |          |         | $LB_W$  | 92.866  |
| (M) | $f_M =$ | 60       |         |         |         |
|     |         | $f_{AM}$ | −34.522 |         |         |
|     |         |          |         | $e_{1M}$ | 31.978 |
|     |         | $f_F$    | 42.212  |         |         |
|     |         |          |         | $LB_M$  | 115.576 |
| (T) | $f_T =$ | 135      |         |         |         |
|     |         | $f_{AT}$ | −40.299 |         |         |
|     |         |          |         | $e_{1T}$ | 14.514 |
|     |         | $f_F$    | 42.212  |         |         |
|     |         |          |         | $LB_T$  | 183.618 |

TABLE 2

| Shifting Distance of the | Photographing Distance (m) | | |
|---|---|---|---|
| Focusing Lens Group (mm) | $f_W = 28$ | $f_M = 60$ | $f_T = 135$ |
| 0.2 | 9.11 | 9.02 | 9.07 |
| 0.5 | 3.77 | 3.69 | 3.72 |
| 1.0 | 1.99 | 1.91 | 1.94 |
| 1.5 | 1.40 | 1.31 | 1.35 |
| 2.0 | 1.11 | 1.02 | 1.05 |
| 2.5 | 0.93 | 0.84 | 0.87 |
| 3.0 | 0.82 | 0.72 | 0.75 |
| 3.5 | 0.74 | 0.64 | 0.67 |
| 4.0 | 0.68 | 0.57 | 0.61 |

In table 1, $f_M$ represents the focal length of the whole lens system at the medium focal length position, $f_{AM}$ represents the focal length of the first lens group A at the medium focal length position, $e_{1W}$, $e_{1M}$ and $e_{1T}$ represent the thin lens distance between the first lens group A and the focusing lens group F at the shortest, the medium and the longest focal length positions, respectively, and $LB_W$, $LB_M$ and $LB_T$ represent the back focal distance at the shortest, the medium and the longest focal length positions.

Figure 4:
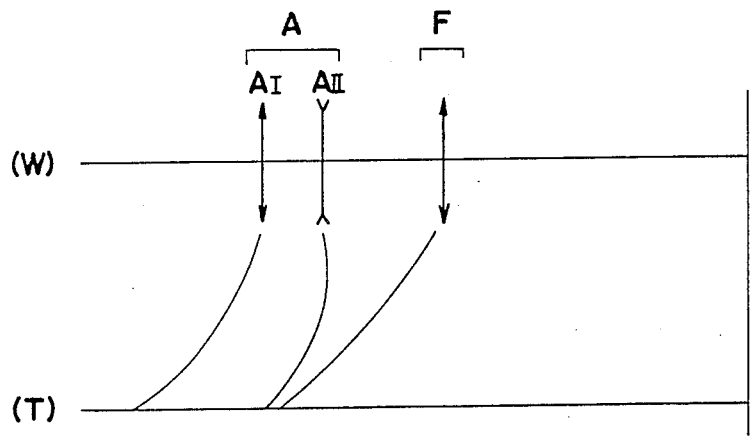
FIG. 4 represents a schematic illustration of a thin lens system and its lens group movements relating to a first embodiment of the present invention.

In the first embodiment, the focal length $f_A$ of the first lens group A varies in accordance with zooming. This means that the first lens group A has to include at least two sub-groups with a first variable air space to be varied for changing the total focal length of the first lens group A. FIG. 4 represents a practical lens design of the first embodiment as a thin lens system and is lens movements. Therefore, the first embodiment of the present invention practically comprises a first lens group A of a total negative refractive power including from the object to the image side a first positive sub-group $A_I$ and a second negative sub-group $A_{II}$ with a first variable air space therebetween to be changed during zooming, and a focusing lens group F of a positive refractive power moved during zooming. Thus, at least three independent components are necessary according to the present invention.

Table 2 shows the change in the photographing distance D in relation to the shifting distance of the focusing lens group F toward the image side at the shortest, the medium and the longest focal length positions, respectively, for the first embodiment of the present invention. Table 2 also shows an error in the photographing distance for an identical shifting distance, especially in the shortest focal length position. This error is caused by the change in Q during focusing and by the approximation (13) since P is kept constant during zooming in the first embodiment. Such an error is, however, remarkably small, which demonstrates that the present invention successfully reduces the difference in the shifting distance for focusing.

Figure 5:
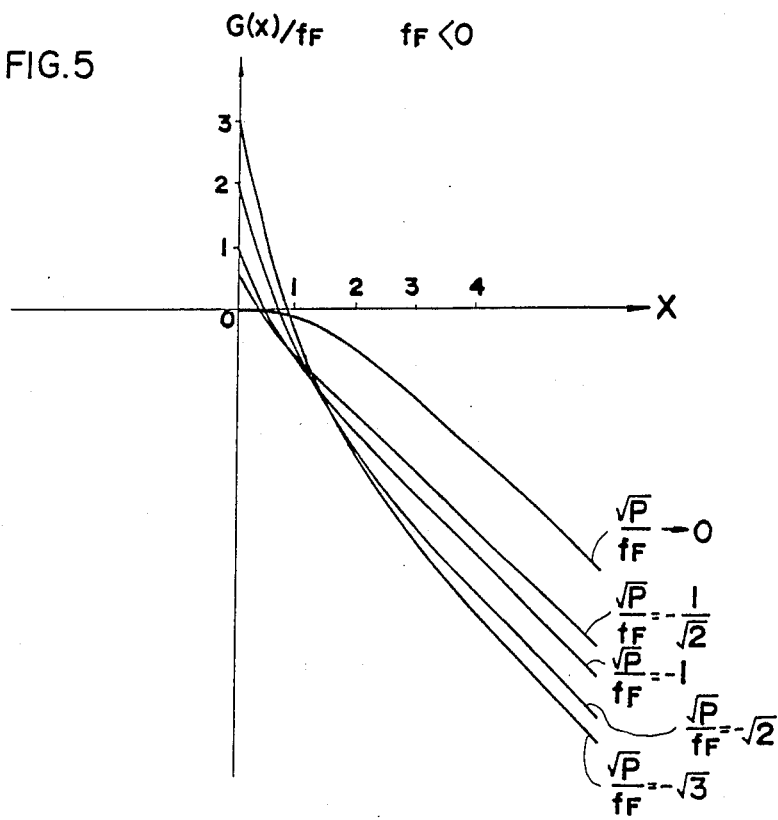
FIG. 5 represents a graphic illustration similar to FIG. 3, for a case of $f_A\beta_F>0$ and $\beta_F>1$.

FIG. 5 represents the relation of $G(X)/f_F$ to X with respect to the case (II). FIG. 5 tells us that $G(X)$ is monotonously increased in accordance with the increase in X since $f_F$ is negative in this case. As to FIG. 5, however, an accurate decision is practically impossible if $\beta_{FW}$ is selected near 1, since the possible error due to the approximation (13) is remarkable.

Table 3 represents a second embodiment of the present invention in a paraxial region designed in accordance with the above case (II), in which lens group B is omitted with the parameter $\sqrt{P}/f_F$ and the minimum lateral magnification $\beta_F$ selected as follows, respectively:

$$\frac{\sqrt{P}}{f_F} = -1 \tag{24}$$

$$\beta_{FW} = 1.2$$

TABLE 3

(Embodiment 2)

| (W) | $f_W =$ | 28       |         |          |         |
|-----|---------|----------|---------|----------|---------|
|     |         | $f_{AW}$ | 23.333  |          |         |
|     |         |          |         | $e_{1W}$ | 16.298  |
|     |         | $f_F$    | −42.212 |          |         |
|     |         |          |         | $LB_W$   | 8.442   |
| (M) | $f_M =$ | 60       |         |          |         |
|     |         | $f_{AM}$ | 34.522  |          |         |
|     |         |          |         | $e_{1M}$ | 16.598  |
|     |         | $f_F$    | −42.212 |          |         |
|     |         |          |         | $LB_M$   | 31.152  |
| (T) | $f_T =$ | 135      |         |          |         |
|     |         | $f_{AT}$ | 40.299  |          |         |
|     |         |          |         | $e_{1T}$ | 10.688  |
|     |         | $f_F$    | −42.212 |          |         |
|     |         |          |         | $LB_T$   | 99.194  |

TABLE 4

| Shifting Distance of the | Photographing Distance (m) | | |
|---|---|---|---|
| Focusing Lens Group (mm) | $f_W = 28$ | $f_M = 60$ | $f_T = 135$ |
| 0.5 | 3.69 | 3.66 | 3.72 |
| 1.0 | 1.92 | 1.88 | 1.93 |
| 2.0 | 1.03 | 0.99 | 1.04 |
| 3.0 | 0.74 | 0.69 | 0.75 |
| 4.0 | 0.60 | 0.54 | 0.60 |

Figure 6:
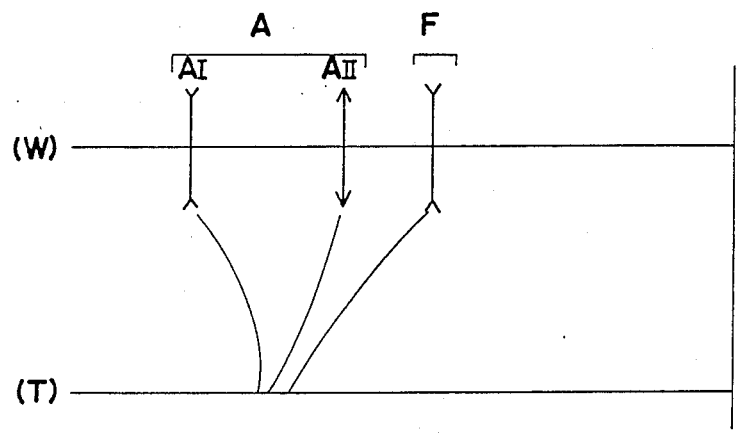
FIG. 6 represents a schematic illustration of a thin lens system and its lens group movements relating to a second embodiment of the present invention.

FIG. 6 represents a practical lens design of the second embodiment in a thin lens system and its lens movements. As shown in FIG. 6, the second embodiment of the present invention practically comprises a first lens group A of a total positive refractive power including from the object to the mage side a first negative sub-group $A_I$ and a second positive sub-group $A_{II}$ with a first variable air space therebetween to realize the change in the total focal length $f_A$ of the first lens group A during zooming, and a focusing lens group F of a negative refractive power moved during zooming.

Table 4 shows the change in the photographing distance D in relation to the shifting distance of the focusing lens group F toward the image side for the respective focal length positions with respect to the second embodiment of the present invention. It will be understood that the error in the photographing distance depending on the focal length f with respect to an identical shifting distance is remarkably small also in the second embodiment.

With respect to the cases (III) or (IV), an embodiment is also possible in a similar manner of design as in the cases (I) or (II). In these cases, however, it should be noted that the lens group B is necessary, and $\beta_B$ and $f_B$ with respect to such a lens group B have to be given.

As has been already pointed out upon adopting equation (21), some error is inherent under the assumption that $f_F$, $\beta_B$ and $f_B$ are constant during zooming. The results of the above discussions with respect to the cases (I) and (II) are consistent with this fact. A question whether or not such an error is tolerable is, however, dependent on the object to design a zoom lens system. In other words, in a varifocal lens system or an autofocus zoom lens system which does not require a shifting distance maintained during zooming, even the result of remarkably reducing the difference in the shifting distance for focusing is rather satisfactory than just tolerable, since such a zoom lens system designed according to the present invention has considerable advantages such as the decrease in the absolute shifting distance necessary to focus an closest object within the entire zoom range and the location of the focusing lens group closer to the camera body generating the driving power of focusing, as well as the remarkably reduced difference in the shifting distance depending on the change in the focal length during zooming.

According to the present inveention, however, it is further sought to remove the above mentioned error to provide a zoom lens system with a novel focusing system comparative to the conventional front group focusing.

The above discussion teaches that the error can be further reduced by means of masking a value such as $f_F$, $\beta_B$ and $f_B$ variable during zooming, which has been previously assumed constant in the above discussion. In other words, $f_F$ is to be made variable if lens group B is omitted, and at least one of $f_F$, $\beta_B$ and $f_B$ is to be made variable if lens group B is adopted. Since the latter case is regarded as only an expansion of the former case, the former case of changing $f_F$ during focusing is to be discussed hereinafter as a representative case.

Refering back to FIG. 3, the curve of $G(X)/f_F$, which generally increases in accordance with the increase in X, i.e. $|\beta_F|$, is shifted toward zero if $\sqrt{P}/f_F$ is increased by means of reducing $f_F$. Therefore, if $f_F$ is reduced in accordance with the increase of X, the change in $G(X)/f_F$ is reduced. This means that the change in $G(X)$ is also reduced by reducing $f_F$ in accordance with the increase of X since $G(X)$ is proportional to $f_F$. Thus, it is concluded that the different in the shifting distance is further reduced if $f_F$ is reduced in accordance with the increase of the focal length f of the whole lens system.

The above explanation, however, refers to a general discussion since the minimum value for $|\beta_F|$ is close to 1 and the error due to the approximation (13) is expected to have a considerable influence. Therefore, it is believed adequate to certify the above conclusion by means of the first embodiment. Namely, if the parameters of the first embodiment for the longest focal length position are modified by means of reducing the focal length $f_F$ of the focusing lens group F at the longest focal length position ($f_T=135$) to 0.85 times the corresponding value at the medium focal length position ($f_M=60$), the following parameters are obtained:

TABLE 5

| (Embodiment 1') | | | | |
|---|---|---|---|---|
| (T) | $f_T =$ | 135 | | |
| | | $f_{AT}$ | −40.299 | |
| | | | | $e_{1T'}$ 6.291 |
| | | $f_{F'}$ | 35.88 | |
| | | | | $LB_{T'}$ 156.083 |
| | | ($f_{F'} = 0.85 f_F$) | | |

In accordance with the modified parameters in Table 5, the photographing distances for respective shifting distances at the longest focal length position ($f_T=135$) are all identical with those at the medium focal length position ($f_M=60$) of table 2, respectively.

Thus, by means of changing the focal length of the focusing lens group F during zooming, it is paraxially possible to adopt an identical shifting distance for focusing to an identical photographing distance irrespective of the change in the focal length of the whole lens system. If this is desired, the focusing lens group has to be practically divided into at least two sub-groups with a variable air space therebetween to be varied for changing the total focal length of the focusing lens group during zooming.

In designing a zoom lens systems with the aberration correction taken into consideration, the lens system has to be a thick lens system. In such a thick lens system, the distance between the principal points should be considered, as well as the fact that the approximation (13) no more holds good. However, the above discussion with respect to the thin lens system is fundamentally true also in the thick lens system. In other words it is possible, also in the thick lens system, to further reduce the difference in the shifting distance by means of changing at least one of $f_F$, $\beta_B$ and $f_B$.

The following table 6 represents a third embodiment of the present invention designed as a thick lens system with the aberration correction taken into consideration.

TABLE 6

(Embodiment 3)
$f = 35.9 \sim 70.0 \sim 102.7 \quad F_{No.} = 4.1$

| | | | Radius of Curvature | | Axial Distance | Refractive Index (Nd) | | Abbe Number ($\nu$d) |
|---|---|---|---|---|---|---|---|---|
| A | $A_I$ | $r_1$ | −421.934 | $d_1$ | 2.000 | $N_1$ | 1.80518 | $\nu_1$ | 25.43 |
| | | $r_2$ | 95.238 | $d_2$ | 6.000 | $N_2$ | 1.69100 | $\nu_2$ | 54.75 |
| | | $r_3$ | −125.494 | $d_3$ | 0.150 | | | | |
| | | $r_4$ | 44.007 | $d_4$ | 3.800 | $N_3$ | 1.78831 | $\nu_3$ | 47.32 |
| | | $r_5$ | 92.826 | $d_5$ | $1.000 \sim 17.474 \sim 21.529$ | | | | |
| | $A_{II}$ | $r_6$ | 50.831 | $d_6$ | 1.200 | $N_4$ | 1.75450 | $\nu_4$ | 51.57 |
| | | $r_7$ | 15.535 | $d_7$ | 4.348 | | | | |
| | | $r_8$ | −121.921 | $d_8$ | 1.200 | $N_5$ | 1.62135 | $\nu_5$ | 61.28 |
| | | $r_9$ | 39.172 | $d_9$ | 0.500 | | | | |
| | | $r_{10}$ | 24.167 | $d_{10}$ | 2.800 | $N_6$ | 1.84666 | $\nu_6$ | 23.88 |
| | | $r_{11}$ | 87.082 | $d_{11}$ | 3.000 | | | | |
| | | $r_{12}$ | −29.809 | $d_{12}$ | 1.200 | $N_7$ | 1.62135 | $\nu_7$ | 61.28 |
| | | $r_{13}$ | −279.569 | $d_{13}$ | $17.679 \sim 7.212 \sim 1.500$ | | | | |
| F | $F_I$ | $r_{14}$ | 137.815 | $d_{14}$ | 3.500 | $N_8$ | 1.51680 | $\nu_8$ | 64.12 |
| | | $r_{15}$ | −51.858 | $d_{15}$ | 0.150 | | | | |
| | | $r_{16}$ | 44.253 | $d_{16}$ | 3.700 | $N_9$ | 1.53241 | $\nu_9$ | 51.54 |
| | | $r_{17}$ | −54.054 | $d_{17}$ | 1.200 | $N_{10}$ | 1.80518 | $\nu_{10}$ | 25.43 |
| | | $r_{18}$ | 1432.541 | $d_{18}$ | $11.781 \sim 3.891 \sim 1.000$ | | | | |
| | $F_{II}$ | $r_{19}$ | 25.986 | $d_{19}$ | 4.150 | $N_{11}$ | 1.60565 | $\nu_{11}$ | 37.81 |
| | | $r_{20}$ | 177.655 | $d_{20}$ | 5.116 | | | | |
| | | $r_{21}$ | −69.722 | $d_{21}$ | 4.600 | $N_{12}$ | 1.80741 | $\nu_{12}$ | 31.59 |
| | | $r_{22}$ | 29.064 | $d_{22}$ | 2.800 | | | | |
| | | $r_{23}$ | −466.446 | $d_{23}$ | 3.431 | $N_{13}$ | 1.51728 | $\nu_{13}$ | 69.56 |
| | | $r_{24}$ | −27.993 | $d_{24}$ | 0.200 | | | | |
| | | $r_{25}$ | 41.201 | $d_{25}$ | 5.721 | $N_{14}$ | 1.51763 | $\nu_{14}$ | 53.47 |
| | | $r_{26}$ | −470.241 | | | | | | |

$\Sigma_d = 91.226 \sim 89.344 \sim 84.796$

With respect to the third embodiment, the focal length $f_F$, the parameters $\sqrt{P}$ and $\sqrt{P}/f_F$ with respect to the focal length f are as follows:

TABLE 7

| f | $f_F$ | $\sqrt{P}$ | $\sqrt{P}/f_F$ |
|---|---|---|---|
| 35.9 | 36.94 | 49.32 | 1.34 |
| 70.0 | 33.93 | 52.07 | 1.53 |
| 102.7 | 32.94 | 52.64 | 1.60 |

As is understood from Table 7, tthe value for the parameter $\sqrt{P}$ is rather changed by a slight value according to the change in the focal length in contrast to the condition (14) in the discussion relating to the paraxial region. Thus, such a slight change in $\sqrt{P}$ is practical in the thick lens system. However, the change in $\sqrt{P}$ is so slight that the requirement by condition (14) is fundamentally true, i.e., $\sqrt{P}$ is substantially maintained during zooming also in the thick lens system. Further, as table 7 teaches, the practical range for $\sqrt{P}/f_F$ in a zoom lens system of a zoom ratio about 3 is as follows:

$$0.5 < \sqrt{P}/f_F < 2.5$$

Figure 7:
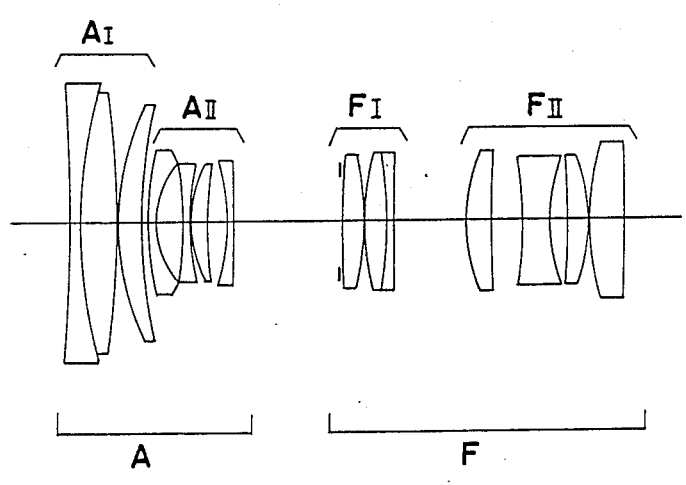
FIG. 7 represents a schematic cross sectional view of a third embodiment of the present invention at the shortest focal length position.

FIG. 7 represents a schematic cross sectional view of the third embodiment, and FIGS. 8 to 10 represent its aberration curves. As in FIG. 7, the third embodiment corresponds to a zoom lens system comprising a first lens group A of a negative refractive power including a frontmost positive sub-group $A_I$ and a negative sub-group $A_{II}$ with a first variable air space defined between the sub-groups $A_I$ and $A_{II}$, the total focal length of the first lens group A being variable in accordance with the change in the first variable air space during zooming, and a focusing lens group F of a positive refractive power located at the image side of the first lens group A including a pair of positive sub-groups $F_I$ and $F_{II}$ with a second variable air space defined between the sub-groups $F_I$ and $F_{II}$, the total focal length of the focusing lens group F being variable in accordance with the change in the second variable air space during zooming, wherein the focusing lens group F is shiftable toward the image side along the optical axis for focusing to a closer object with a second variable air space maintained. Further, a third air space defined between the first lens grop A and the focusing lens group F is variable during zooming.

The following table 8 represents the image plane deviation at the shortest and medium focal lengths from the image plane at the longest focal length when the shifting distance of the longest focal length is commonly adopted.

TABLE 8

| Photographing Distance (m) | Shifting Distance of the Focusing lens group at $f = 102.7$ (mm) | Image Plane Diviation (mm) | |
|---|---|---|---|
| | | $f = 35.88$ | $f = 70.0$ |
| 50.0 | 0.056 | −0.004 | −0.002 |
| 20.0 | 0.139 | −0.009 | −0.004 |
| 15.0 | 0.186 | −0.012 | −0.006 |
| 10.0 | 0.279 | −0.016 | −0.009 |
| 7.0 | 0.399 | −0.021 | −0.011 |
| 5.0 | 0.561 | −0.027 | −0.015 |
| 4.0 | 0.703 | −0.031 | −0.017 |
| 3.0 | 0.942 | −0.034 | −0.020 |
| 2.5 | 1.135 | −0.035 | −0.020 |
| 2.0 | 1.428 | −0.032 | −0.020 |
| 1.7 | 1.689 | −0.024 | −0.016 |
| 1.5 | 1.923 | −0.015 | −0.010 |

As is apparent from table 8, the deviations of the image plane of the shortest or medium focal length position from that of the longest focal length position are so small as to be covered within the depth of focus. Therefore, an identical shifting distance can be adopted for an identical photographing distance irrespective of the change in the focal length in the third embodiment, which is comparative to the conventional front group focusing.

As in the third embodiment, a novel focusing system comparative to the front group focusing is possible according to the present invention. However, it is easy to modify such a novel focusing system into a focusing system in which the ratio of the shifting distance at the longest focal length to that at the shortest focal length with respect to an identical photographing distance is about 2 to 3. And, such a modification is of course within the scope of the present invention, since the remarkably small ratio such as about 2 to 3 with respect to the shifting distance is not only tolerable into a auto-focus zoom lens system or a varifocal lens system, which is quite indifferent to the existance of the difference in the shifting distance itself, but also rather advantageous in comparison with a whole lens system focusing in which the ratio of the shifting distance can be even the square of the zoom ratio. This advantage increases, as the zoom ratio is increased. Further, some tolerable difference in the shifting distance intentionally left existing is expected to be favorable to the aberration correction.

Figure 11:
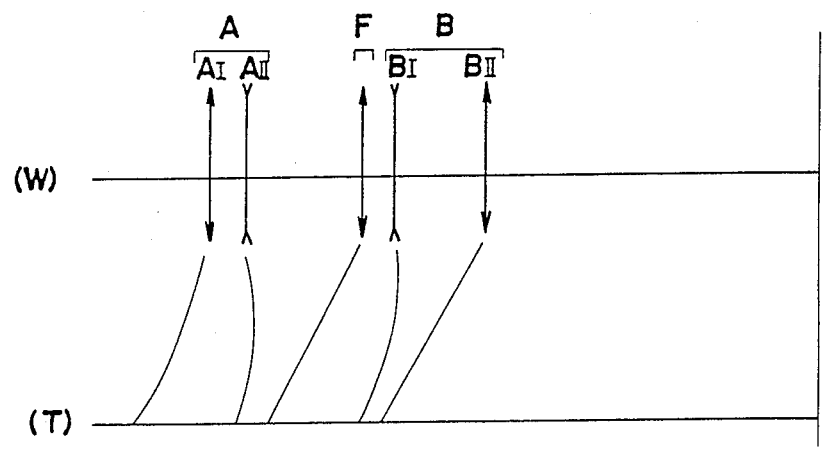
FIG. 11 represents a schematic illustration of a thin lens system and its lens group movements relating to a fourth embodiment of the present invention.

FIG. 11 represents a fourth embodiment of the present invention in a thin lens system, which comprises a first lens group A of a negative refractive power including a frontmost positive sub-group $A_I$ and a negative sub-group $A_{II}$ with a first variable air space defined between the sub-groups $A_I$ and $A_{II}$, the total focal length of the first lens group A being variable in accordance with the change in the first variable air space during zooming, a focusing lens group F of a positive refractive power located at the image side of the first lens group A and shiftable along the optical axis toward the image side for focusing to a closer object, and another lens group B located at the image side of the focusing lens group F including a first negative sub-group $B_I$ and a second positive sub-group $B_{II}$ with another variable air space defined between the sub-groups $B_I$ and $B_{II}$, the total focal length of the lens group B being variable in accordance with the change in the sub-group variable air space during zooming.

The design concept of the fourth embodiment is as follows. Namely, in the case of the third embodiment, although a zoom ratio about 3 is possible, a still greater zoom ratio is relatively difficult to be realized in that the movement of the focusing lens group F during zooming would be excessively increased to realize the necessary change in $\beta_F$ for changing f, which is unfavorable to the manufacturing tolerance. To this, the fourth embodiment is characterized by the additional lens group B being capable of greatly participating in increasing the zoom ratio by means of the change in $\beta_B$ generated by its changeable focal length $f_B$ during zooming to reduce the necessary movement of the focusing lens group F during zooming by means of saving the change in $\beta_F$. See equation (1).

The fifth and sixth embodiments of the present invention disclose another design for increasing the zoom ratio, especially in a zoom range covering a wide field angle. Namely, as in FIGS. 12 and 16, the fifth and sixth embodiments each provide a zoom lens system of a relatively great zoom ratio covering a wide field angle comprising, from the object to the image side, a first lens group A of a negative refractive power including at least a frontmost positive sub-group $A_I$ and a negative sub-group $A_{II}$ with a first variable air space therebetween, the total focal length $f_A$ of the first lens group A being variable in accordance with the change in the first variable air space during zooming, and a focusing lens group F of a positive refractive power to converge the light pencil at the image side of the focusing lens group F and includes three sub-groups $F_I$, $F_{II}$ and $F_{III}$ with a second variable air space defined between sub-groups $F_I$ and $F_{II}$, and a third variable air space betwen sub-groups $F_{II}$ and $F_{III}$. The total focal length $f_F$ of the focusing lens group F being variable in accordance with the change in the second and third variable air spaces during zooming, while the second and third variable air spaces being maintained upon the shift of the focusing lens group F toward the image side for focusing to a closer object, wherein the lateral magnification $\beta_F$ with respect to the focusing lens group is continuously variable during zooming so that $|\beta_F|$ is increased in accordance with the increase of the focal length f of the whole lens system, and wherein the lens system fulfills the following condition:

$$<2> \beta_{FW} \leq -1.05$$

wherein: $\beta_{FW}$ represents the lateral magnification with respect to the focusing lens group F at the shortest focal length of the whole lens system in zooming when the lens system is focused in infinity. Further, a fourth air space defined between the first lens group A and the focusing lens group F is variable during zooming.

In designing a zoom lens system of a relatively great zoom ratio covering a wide field angle, it is necessary to locate a frontmost positive component in view of the optical performance in the longer focal length side and the manufacturing tolerance. This leads to the frontmost positive sub-group $A_I$ of the fifth and sixth embodiments. Further, the negative focal length of the first lens group A is favorable to the shorter focal length required to realize a wide field angle. Thus, the first lens group A of the fifth and sixth embodiments each include at least the second sub-group $A_{II}$ of a negative refractive power at the image side of the first sub-group $A_{II}$ to make the total focal length of the first lens group A negative. Such a lens design generally corresponds to the above mentioned cases (I) or (IV). The case (IV), however, requires the additional lens group B of a positive refractive power to converge the divergent light pencil emerging from the focusing lens group F, which contradicts the lens design of the fifth and sixth embodiments. Thus, the fifth and sixth embodiments are directed to the case (I) explained in relation to FIG. 3, in which $\beta_F < -1$.

Upon practical focusing, however, $|\beta_F|$ is reduced in accordance with the decrease of the photographing distance in the zoom lens system comprising the negative first lens group A and the positive focusing lens group F with $\beta_F < -1$ always fulfilled across the entire zoom range. Therefore, if $\beta_{FW}$, the absolute value of which is the minimum of that of all possible $\beta_F$ within the zoom range, is excessively close to $-1$ upon infinity focusing, $\beta_F$ would instantly reach $-1$ as a result of a slight focusing toward a closer object, which causes the value of P indefinite to make further focusing impossible. Therefore, $\beta_{FW}$ should fulfill the following condition to secure a focusing to a practical closer photographing distance:

$$\beta_{FW} \leq -1.05$$

Further, the final conclusion of the practical range for $\beta_{FW}$ is as follows with the already mentioned requirement of $|\beta_{FW}| < 2$ taken into consideration:

$$-2 < \beta_{FW} \leq -1.05$$

The fifth and sixth embodiments adopt a design of reducing the focal length $f_F$ of the focusing lens group F in accordance with the increase of the focal length f of the whole lens system during zooming for the purpose of minimizing the change in the shifting distance. To change the focal length $f_F$ of the focusing lens group F during zooming, the focusing lens group F has to generally include at least two sub-groups with one variable air space therebetween. A focusing lens group F consisting of only two sub-groups would, however, be unsatisfactory in a zoom lens system with a great zoom ratio covering a wide field angle. Namely, if the refractive powers of such two sub-groups are positive and negative, the total focal length $f_F$ of the focusing lens group F would no more be effectively changed since the refractive power of the negative sub-group should be weak in view of the requirement of $\beta_{FW} \leq -1.05$. On the other hand, if the refractive powers of the two sub-groups are both positive, the movement of the focusing lens group F during zooming would not be effectively reduced in a high zoom ratio zoom lens system due to the insufficient shift of the principal point of the focusing lens group F during zooming, to fail in designing a compact zoom lens system, although the total focal length $f_F$ may be favorably changed by means of distributing even powers to the two positive sub-groups and changing the air space therebetween. Thus, in the high zoom ratio zoom lens system covering a wide field angle, it is necessary for the focusing lens group F to include three sub-groups with two variable air spaces therebetween, respectively.

In designing the focusing lens group F with three sub-groups, it is recommended that the focusing lens group F consists, from the object to the image side, of a first positive sub-group $F_I$, a second negative sub-group $F_{II}$ and a third positive sub-group $F_{III}$. This design is especially effective to increase both the variation in the focal length $f_F$ and the shift of the principal point of the focusing lens group F during zooming, which are favorable to the demands of reducing the difference in the shifting distance for focusing and reducing the necessary movement of the focusing lens group F during zooming.

Thus, the features of the fifth and sixth embodiments are summarized in that:

(a) the refractive power of the focusing lens group is positive;

(b) the lateral magnification $\beta_F$ with respect to the focusing lens group F continuously varies during focusing so that $|\beta_F|$ increases in accordance with the increase of the focal length f of the whole lens system;

(c) the lateral magnification $\beta_{FW}$ with respect to the focusing lens group F at the shortest focal length position with the lens system focused in infinity is within the following range:

$$-2 < \beta_{FW} \leq -1.05$$

(d) the focusing lens group F includes three sub-groups with two variable air spaces therebetween to be varied for changing the total focal length $f_F$ of the focusing lens group F during zooming;

(e) the focusing lens group is shifted toward the image side in a body with the two variable air spaces maintained for focusing a closer object;

(f) the light pencil is convergent at the image side of the focusing lens group F;

(g) the first lens group A located at the object side of the focusing lens group F is of a negative refractive power; and (h) the first lens group A includes at least a frontmost positive sub-group and a negative sub-group with at least one variable air space to be varied for changing the total focal length $f_A$ of the first lens group A during zooming.

It is needless to say that focusing to a desired minimum photographing distance would be impossible if the upper limit of the condition in the above feature (c) is violated, while the change in $f_A$ would be insufficient during zooming to fail in attaining the zoom lens system according to the present invention if the lower limit of the same is violated.

The following table 9 represents the design parameters of the fifth embodiment of the present invention discussed above, in which the ratio of the shifting distance for an identical photographic distance is about 2.

TABLE 9

(Embodiment 5)
$f = 28.8 \sim 60.0 \sim 131.5$   $F_{No.} = 3.6 \sim 4.2 \sim 4.63$

| | | | Radius of Curvature | | Axial Distance | Refractive Index (Nd) | | Abbe Number ($\nu d$) | |
|---|---|---|---|---|---|---|---|---|---|
| A | $A_I$ | $r_1$ | 107.240 | $d_1$ | 2.000 | $N_1$ | 1.84666 | $\nu_1$ | 23.88 |
| | | $r_2$ | 61.126 | $d_2$ | 8.000 | $N_2$ | 1.69100 | $\nu_2$ | 54.75 |
| | | $r_3$ | 1404.138 | $d_3$ | 0.120 | | | | |
| | | $r_4$ | 44.311 | $d_4$ | 3.500 | $N_3$ | 1.67000 | $\nu_3$ | 57.07 |
| | | $r_5$ | 65.821 | $d_5$ | $0.600 \sim 21.385 \sim 39.068$ | | | | |
| | $A_{II}$ | $r_6$ | 49.256 | $d_6$ | 1.200 | $N_4$ | 1.77250 | $\nu_4$ | 49.77 |
| | | $r_7$ | 15.985 | $d_7$ | 7.000 | | | | |
| | | $r_8$ | −332.034 | $d_8$ | 1.100 | $N_5$ | 1.77250 | $\nu_5$ | 49.77 |
| | | $r_9$ | 32.393 | $d_9$ | 2.000 | | | | |
| | | $r_{10}$ | 23.249 | $d_{10}$ | 3.800 | $N_6$ | 1.80518 | $\nu_6$ | 25.43 |
| | | $r_{11}$ | −728.040 | $d_{11}$ | 1.500 | | | | |
| | | $r_{12}$ | −52.445 | $d_{12}$ | 1.100 | $N_7$ | 1.77250 | $\nu_7$ | 49.77 |
| | | $r_{13}$ | 45.243 | $d_{13}$ | $20.202 \sim 9.974 \sim 2.000$ | | | | |
| F | $F_I$ | $r_{14}$ | 57.322 | $d_{14}$ | 2.200 | $N_8$ | 1.69100 | $\nu_8$ | 54.75 |
| | | $r_{15}$ | 394.907 | $d_{15}$ | 0.120 | | | | |
| | | $r_{16}$ | 36.606 | $d_{16}$ | 1.500 | $N_9$ | 1.84666 | $\nu_9$ | 23.88 |
| | | $r_{17}$ | 16.869 | $d_{17}$ | 6.500 | $N_{10}$ | 1.58913 | $\nu_{10}$ | 61.11 |
| | | $r_{18}$ | −118.573 | $d_{18}$ | 0.120 | | | | |
| | | $r_{19}$ | 45.195 | $d_{19}$ | 3.200 | $N_{11}$ | 1.58913 | $\nu_{11}$ | 61.11 |
| | | $r_{20}$ | −70.704 | $d_{20}$ | $1.200 \sim 7.643 \sim 14.934$ | | | | |
| | $F_{II}$ | $r_{21}$ | −52.263 | $d_{21}$ | 3.000 | $N_{12}$ | 1.80518 | $\nu_{12}$ | 25.43 |
| | | $r_{22}$ | −16.611 | $d_{22}$ | 1.100 | $N_{13}$ | 1.77250 | $\nu_{13}$ | 49.77 |
| | | $r_{23}$ | 66.755 | $d_{23}$ | $15.234 \sim 8.791 \sim 1.500$ | | | | |
| | $F_{III}$ | $r_{24}$ | −206.857 | $d_{24}$ | 3.500 | $N_{14}$ | 1.51680 | $\nu_{14}$ | 64.12 |
| | | $r_{25}$ | −38.717 | $d_{25}$ | 0.120 | | | | |
| | | $r_{26}$ | 205.366 | $d_{26}$ | 6.500 | $N_{15}$ | 1.69100 | $\nu_{15}$ | 54.75 |
| | | $r_{27}$ | −24.092 | $d_{27}$ | 1.424 | | | | |
| | | $r_{28}$ | −21.225 | $d_{28}$ | 1.400 | $N_{16}$ | 1.80518 | $\nu_{16}$ | 25.43 |
| | | $r_{29}$ | −69.232 | | | | | | |

$\Sigma_d = 99.240 \sim 109.797 \sim 119.506$

TABLE 10

| f | $f_A$ | $\beta_F$ | $f_F$ | $\sqrt{P}$ | $\sqrt{P}/f_F$ |
|---|---|---|---|---|---|
| 28.8 | −23.26 | −1.24 | 35.47 | 39.46 | 1.11 |
| 60.0 | −33.16 | −1.81 | 31.93 | 39.80 | 1.25 |
| 131.5 | −52.01 | −2.53 | 27.23 | 56.64 | 2.08 |

TABLE 11

| Photographing Distance (m) | Shifting Distance of the Focusing Lens Group (mm) | | |
|---|---|---|---|
| | f = 28.8 | f = 60.0 | f = 131.5 |
| 50.0 | 0.031 | 0.032 | 0.064 |
| 30.0 | 0.052 | 0.053 | 0.107 |
| 20.0 | 0.079 | 0.080 | 0.160 |
| 15.0 | 0.105 | 0.106 | 0.213 |
| 10.0 | 0.158 | 0.160 | 0.320 |
| 7.0 | 0.228 | 0.229 | 0.456 |
| 5.0 | 0.322 | 0.322 | 0.638 |
| 4.0 | 0.406 | 0.404 | 0.796 |
| 3.0 | 0.550 | 0.541 | 1.059 |
| 2.5 | 0.669 | 0.653 | 1.269 |
| 2.0 | 0.852 | 0.822 | 1.582 |
| 1.7 | 1.020 | 0.974 | 1.857 |
| 1.5 | 1.175 | 1.111 | 2.100 |

TABLE 12

| Photographing Distance (m) | Image Plane Deviation (mm) | |
|---|---|---|
| | f = 28.8 | f = 60.0 |
| 50.0 | −0.002 | −0.004 |
| 30.0 | −0.004 | −0.006 |
| 20.0 | −0.005 | −0.009 |
| 15.0 | −0.007 | −0.011 |
| 10.0 | −0.009 | −0.015 |
| 7.0 | −0.012 | −0.020 |
| 5.0 | −0.015 | −0.023 |
| 4.0 | −0.016 | −0.024 |
| 3.0 | −0.016 | −0.022 |
| 2.5 | −0.014 | −0.016 |
| 2.0 | −0.009 | −0.001 |
| 1.7 | −0.001 | 0.018 |
| 1.5 | 0.009 | 0.039 |

Figure 12:
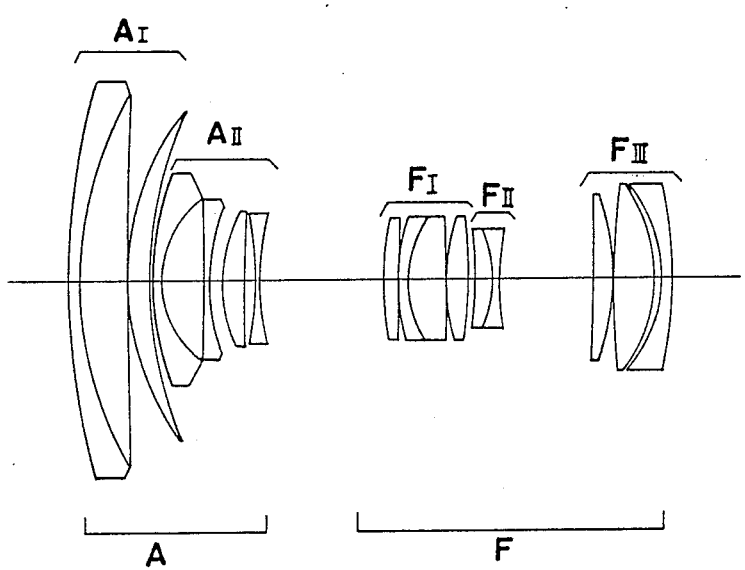
FIG. 12 represents a schematic cross sectional view of a fifth embodiment of the present invention at the shortest focal length position.
Figure 13A:
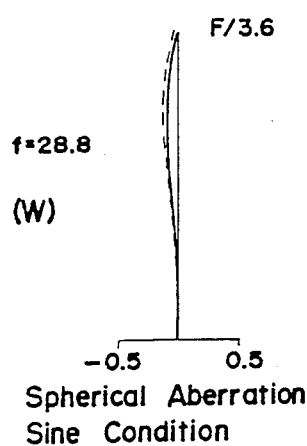
FIGS. 13a, 13b and 13c represent graphic plots of various aberrations of the fifth embodiment in the shortest focal length position.
Figure 13B:
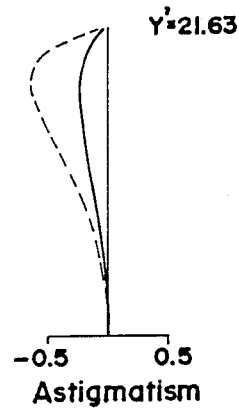
Figure 13C:
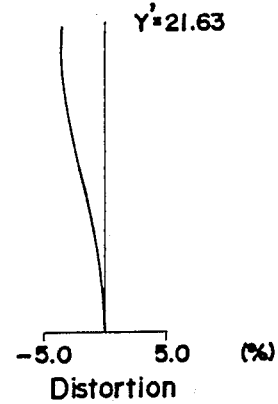
Figure 14A:
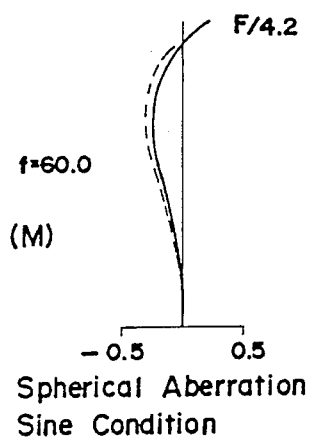
FIGS. 14a, 14b and 14c represent graphic plots of various aberrations of the fifth embodiment in the medium focal length position.
Figure 14B:
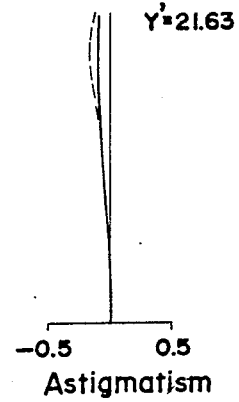
Figure 14C:
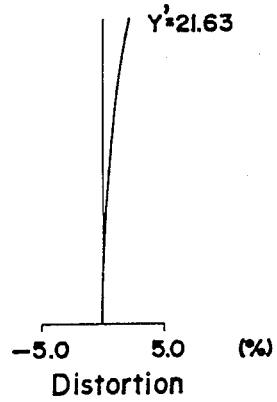
Figure 15A:
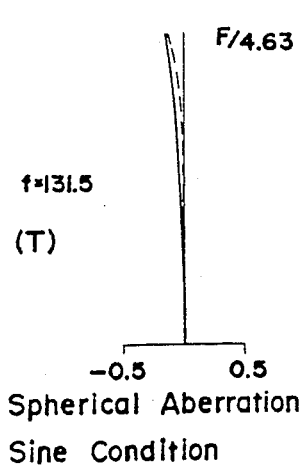
FIGS. 15a, 15b and 15c represent graphic plots of various aberrations of the fifth embodiment in the longest focal length position.
Figure 15B:
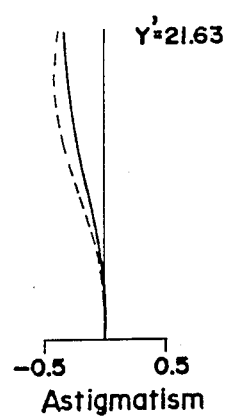
Figure 15C:
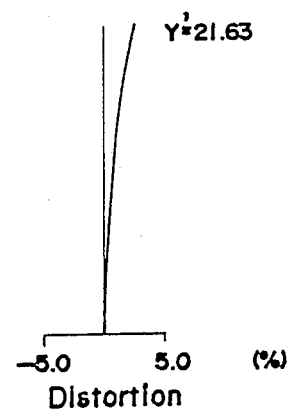

It should be noted that the second sub-group $F_{II}$ is left stationary during zooming in the fifth embodiment in table 9. FIG. 12 represents the schematic cross sectional view of the fifth embodiment, and FIGS. 13 to 15 represent its aberration curves for respective focal length positions. Table 10 shows the values of $f_A$, $\beta_F$, $\sqrt{P}$ and $\sqrt{P}/f_F$ for a change in focal length f.

if a shifting distance of 0.55 or 0.52 times the shifting distance of the longest focal length is adopted.

TABLE 13

(Embodiment 6)
f = 28.8~60.0~131.5  $F_{No.}$ = 3.6~4.3~5.0

| | | | Radius or Curvature | Axial Distance | | Refractive Index (Nd) | | Abbe Number (νd) |
|---|---|---|---|---|---|---|---|---|
| A | $A_I$ | $r_1$ | 151.922 | | | | | |
| | | | | $d_1$ 2.000 | $N_1$ | 1.84666 | $\nu_1$ | 23.88 |
| | | $r_2$ | 75.884 | | | | | |
| | | | | $d_2$ 7.500 | $N_2$ | 1.69100 | $\nu_2$ | 54.75 |
| | | $r_3$ | 6237.910 | | | | | |
| | | | | $d_3$ 0.120 | | | | |
| | | $r_4$ | 39.584 | | | | | |
| | | | | $d_4$ 4.000 | $N_3$ | 1.67000 | $\nu_3$ | 57.7 |
| | | $r_5$ | 52.025 | | | | | |
| | | | | $d_5$ 0.600~25.100~34.600 | | | | |
| | $A_{II}$ | $r_6$ | 40.307 | | | | | |
| | | | | $d_6$ 1.200 | $N_4$ | 1.77250 | $\nu_4$ | 49.77 |
| | | $r_7$ | 17.719 | | | | | |
| | | | | $d_7$ 7.500 | | | | |
| | | $r_8$ | −147.765 | | | | | |
| | | | | $d_8$ 2.500 | $N_5$ | 1.75000 | $\nu_5$ | 25.14 |
| | | $r_9$ | −66.964 | | | | | |
| | | | | $d_9$ 1.100 | $N_6$ | 1.75450 | $\nu_6$ | 51.57 |
| | | $r_{10}$ | 36.734 | | | | | |
| | | | | $d_{10}$ 2.000 | | | | |
| | | $r_{11}$ | 25.771 | | | | | |
| | | | | $d_{11}$ 3.500 | $N_7$ | 1.75000 | $\nu_7$ | 25.14 |
| | | $r_{12}$ | 472.543 | | | | | |
| | | | | $d_{12}$ 1.800 | | | | |
| | | $r_{13}$ | −56.807 | | | | | |
| | | | | $d_{13}$ 1.100 | $N_8$ | 1.77250 | $\nu_8$ | 49.77 |
| | | $r_{14}$ | 51.639 | | | | | |
| | | | | $d_{14}$ 25.014~11.987~2.000 | | | | |
| F | $F_I$ | $r_{15}$ | 104.369 | | | | | |
| | | | | $d_{15}$ 2.500 | $d_9$ | 1.69100 | | 54.75 |
| | | $r_{16}$ | −103.704 | | | | | |
| | | | | $d_{16}$ 0.120 | | | | |
| | | | | $d_{17}$ 1.500 | $N_{10}$ | 1.84666 | $\nu_{10}$ | 23.88 |
| | | $r_{18}$ | 20.201 | | | | | |
| | | | | $d_{18}$ 8.000 | $N_{11}$ | 1.58913 | $\nu_{11}$ | 61.11 |
| | | $r_{19}$ | −97.798 | | | | | |
| | | | | $d_{19}$ 0.120 | | | | |
| | | $r_{20}$ | 39.409 | | | | | |
| | | | | $d_{20}$ 4.000 | $N_{12}$ | 1.58913 | $\nu_{12}$ | 61.11 |
| | | $r_{21}$ | −94.078 | | | | | |
| | | | | $d_{21}$ 1.200~9.166~22.565 | | | | |
| | $F_{II}$ | $r_{22}$ | −75.491 | | | | | |
| | | | | $d_{22}$ 3.500 | $N_{13}$ | 1.80518 | $\nu_{13}$ | 25.43 |
| | | $r_{23}$ | −19.616 | | | | | |
| | | | | $d_{23}$ 1.100 | $N_{14}$ | 1.77250 | $\nu_{14}$ | 49.77 |
| | | $r_{24}$ | 41.966 | | | | | |
| | | | | $d_{24}$ 22.865~14.899~1.500 | | | | |
| | $F_{III}$ | $r_{25}$ | −206.856 | | | | | |
| | | | | $d_{25}$ 4.000 | $N_{15}$ | 1.51680 | $\nu_{15}$ | 64.12 |
| | | $r_{26}$ | −36.148 | | | | | |
| | | | | $d_{26}$ 0.120 | | | | |
| | | $r_{27}$ | 3576.025 | | | | | |
| | | | | $d_{27}$ 6.500 | $N_{16}$ | 1.51680 | $\nu_{16}$ | 64.12 |
| | | $r_{28}$ | −24.056 | | | | | |
| | | | | $d_{28}$ 1.501 | | | | |
| | | $r_{29}$ | −22.233 | | | | | |
| | | | | $d_{29}$ 1.400 | $N_{17}$ | 1.84666 | $\nu_{17}$ | 23.88 |
| | | $r_{30}$ | −42.663 | | | | | |

$\Sigma_d$ = 118.360~129.833~129.346

Table 11 represents the shifting distance of the focusing lens group F toward the image side for respective focal length positions, which reveals that the ratio of the shifting distance between the shortest and the longest focal length positions is about 2.

Table 12 represents the image plane deviation at the shortest and the medium focal length positions when a 0.55 times the shifting distance of the longest focal length position and a 0.52 times the shifting distance of the longest focal length position are adopted, respectively. Table 12 tells us that the deviations of the image plane of the shortest or medium focal length from that of the longest focal length are within the depth of focus

TABLE 14

| f | $f_A$ | $\beta_F$ | $f_F$ | P | $P/f_F$ |
|---|---|---|---|---|---|
| 28.8 | −23.26 | −1.24 | 42.32 | 39.46 | 0.93 |
| 60.0 | −31.76 | −1.89 | 36.17 | 37.44 | 1.03 |
| 131.5 | −37.00 | −3.55 | 25.18 | 38.56 | 1.53 |

TABLE 15

| Photographing Distance (m) | Shifting Distance of the Focusing Lens Group at f = 131.5 (mm) | Image Plane Deviation (mm) | |
|---|---|---|---|
| | | f = 28.8 | f = 60.0 |
| 50.0 | 0.030 | 0.001 | −0.004 |
| 30.0 | 0.050 | 0.001 | −0.007 |
| 20.0 | 0.074 | 0.002 | −0.011 |
| 15.0 | 0.099 | 0.003 | −0.014 |
| 10.0 | 0.149 | 0.005 | −0.021 |
| 7.0 | 0.214 | 0.007 | −0.030 |
| 5.0 | 0.301 | 0.011 | −0.040 |
| 4.0 | 0.377 | 0.015 | −0.049 |
| 3.0 | 0.505 | 0.023 | −0.062 |
| 2.5 | 0.608 | 0.031 | −0.072 |
| 2.0 | 0.765 | 0.043 | −0.085 |
| 1.7 | 0.904 | 0.057 | −0.094 |
| 1.5 | 1.030 | 0.070 | −0.101 |

Figure 16:
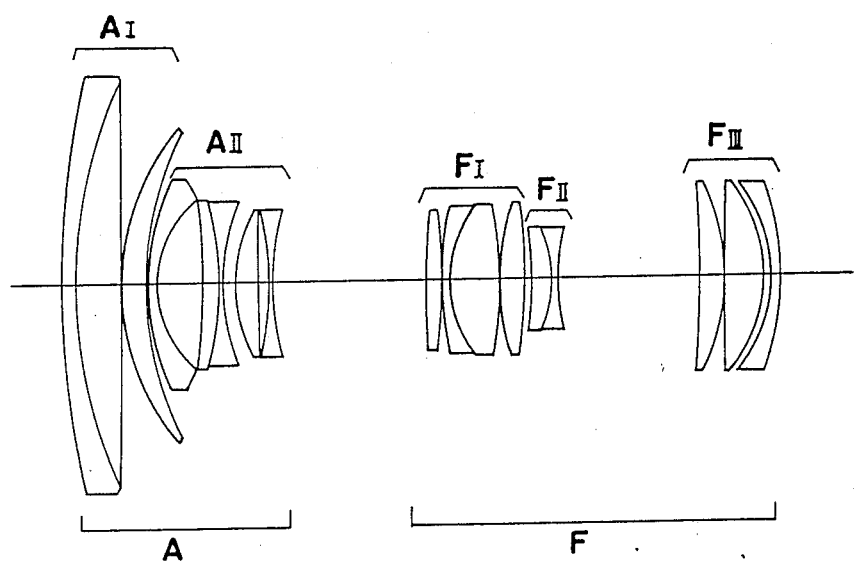
FIG. 16 represents a schematic cross sectional view of a sixth embodiment of the present invention at the shortest focal length position.

Table 13 represents the design parameters of the above discussed sixth embodiment, in which a zoom lens system with a focusing system comparative to the conventional front group focusing system is attained. FIG. 16 represents the schematic cross sectional view of the fifth embodiment, while FIGS. 17 to 19 represent its aberration curves for the respective focal lengths. Table 14 shows the values of $f_A$, $\beta_F$, $f_F\sqrt{P}$ and $\sqrt{P}/f_F$ for a change in focal length f.

Table 15 represents the image plane deviation at the shortest and the medium focal length positions with respect to the shifting distance of the longest focal length, wherein the deviations of the image plane of the shortest and the medium focal length positions from that of the longest focal length position are within the depth of focus, which is comparative to the conventional front group focusing. Thus, the sixth embodiment can adopt a common shifting distance for focusing an identical photographing distance irrespective of the change in the focal length of the whole lens system.

As to the change in the lateral magnification with respect to the focusing lens group F during close focusing at the shortest focal length position, the fifth and sixth embodiments show the following values. Namely, with respect to the fifth embodiment, the focal length $f_F$ at the shortest focal length f=28.8 is 35.47 from table 10, and the shifting distance to focus a photographing distance 1.5 m at the shortest focal length f=28.8 is 1.175 from table 11. Therefore, the change in lateral magnification $\beta_F$ is 1.175/35.47=0.033. Thus the lateral magnification $\beta_F$ at the shortest focal length f=28.8 is changed from −1.24 to −1.207 upon close focusing to 1.5 m. On the other hand, with respect to the sixth embodiment, the focal length $f_F$ at the shortest focal length f=28.8 is 42.32 from table 14, and the common shifting distance to focus a photographing distance 1.5 m is 1.030 from table 15. Therefore, the change in lateral magnification $\beta_F$ is 1.030/42.32=0.024. Thus, the lateral magnification $\beta_F$ at the shortest focal length f=28.8 is changed from −1.24 to −1.216 upon close focusing to 1.5 m.

While the above embodiments have been disclosed as the best modes presently contemplated by the inventor, it should be realized that these examples should not be interpreted as limiting, because artisans skilled in this field, once given the present teachings, can vary from these specific embodiments. Accordingly, the scope of the present invention should be determined solely from the following claims.

What is claimed is:

1. A zoom lens system comprising:
   a first positive lens group including at least two subgroups with a variable air space therebetween, the total focal length of the first lens group being variable in accordance with the change in the variable air space during zooming; and
   a negative focusing lens group located at the image side of the first lens group with an air space variable during zooming between the first lens group and the focusing lens group, the focusing lens group being shiftable along the optical axis for focusing, the lateral magnification, $\beta_F$, with respect to the focusing lens group being continuously variable during zooming with a condition, $$|\beta_F| > 1$$

always fulfilled so that $|\beta_F|$ is increased in accordance with the increase of the focal length of the whole lens system.

2. A zoom lens system comprising:
   a first negative lens group including at least two subgroups with a variable air space therebetween, the total focal length of the first lens group being variable in accordance with the change in the variable air space during zooming; and
   a positive focusing lens group located at the image side of the first lens group with an air space variable during zooming between the first lens group and the focusing lens group, the focusing lens group being shiftable along the optical axis for focusing, the lateral magnification, $\beta_F$, being negative and with respect to the focusing lens group being continuously variable during zooming with a condition, $$|\beta_F| > 1$$

always fulfilled so that $|\beta_F|$ is increased in accordance with the increase of the focal length of the whole lens system.

3. A zoom lens system comprising:
   a first negative lens group including at least two subgroups with a variable air space therebetween, the total focal length of the first lens group being variable in accordance with the change in the variable air space during zooming; and
   a positive focusing lens group located at the image side of the first lens group with an air space variable during zooming between the first lens group and the focusing lens group, the focusing lens group being shiftable along the optical axis for focusing, the lateral magnification, $\beta_F$, with respect to the focusing lens group being continuously variable during zooming with a condition, $$|\beta_F|>1$$

always fulfilled so that $|\beta_F|$ is increased in accordance with the increase of the focal length of the whole lens system, the lens system further fulfilling the following condition:

$$1<|\beta_{FW}|<2$$

wherein: $\beta_{FW}$ represents a negative value for the lateral magnification with respect to the focusing lens group at the shortest focal length of the whole lens system in zooming when the lens system is focused in infinity.

4. A zoom lens system comprising:

a first lens group including at least two sub-groups with a variable air space therebetween, the total focal length of the first lens group being variable in accordance with the change in the variable air space during zooming; and a focusing lens group located at the image side of the first lens group with an air space variable during zooming between the first lens group and the focusing lens group, the focusing lens group being shiftable along the optical axis for focusing, the lateral magnification, $\beta_F$, with respect to the focusing lens group being continuously variable during zooming with a condition, $$\beta_F<-1$$

always fulfilled so that an absolute value for $\beta_F$ is increased in accordance with the increase of the focal length of the whole lens system.

5. A zoom lens system comprising:

a first lens group including at least two sub-groups with a variable air space therebetween, the total focal length of the first lens group being variable in accordance with the change in the variable air space during zooming; and a focusing lens group located at the image side of the first lens group with an air space variable during zooming between the first lens group and the focusing lens group, the focusing lens group being shiftable along the optical axis for focusing, the lateral magnification, $\beta_F$, with respect to the focusing lens group being continuously variable during zooming with a condition, $$|\beta_F|>1$$

always fulfilled so that $|\beta_F|$ is increased in accordance with the increase of the focal length of the whole lens system and the lens system further fulfills the following conditon;

$$-2<\beta_{FW}<-1$$

wherein: $\beta_{FW}$ represents the lateral magnification with respect to the focusing lens group at the shortest focal length of the whole lens system in zooming when the lens system is focused in infinity.

6. The invention of claim 5, wherein $\beta_{FW}$ infinity fulfills the followng condition:

$$-2<\beta_{FW}\leq-1.05.$$

* * * * *